United States Patent
Barr et al.

(10) Patent No.: US 7,146,519 B2
(45) Date of Patent: *Dec. 5, 2006

(54) BUS CLOCK FREQUENCY MANAGEMENT BASED ON DEVICE BANDWIDTH CHARACTERISTICS

(75) Inventors: Andrew H. Barr, Roseville, CA (US); Ricardo Espinoza-Ibarra, Lincoln, CA (US); Kevin M. Somervill, Newport News, VA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 433 days.

This patent is subject to a terminal disclaimer.

(21) Appl. No.: 10/646,099

(22) Filed: Aug. 22, 2003

(65) Prior Publication Data

US 2005/0044442 A1 Feb. 24, 2005

(51) Int. Cl.
G06F 1/04 (2006.01)
G06F 1/06 (2006.01)
G06F 1/08 (2006.01)

(52) U.S. Cl. ...................... 713/500; 713/500; 713/501; 713/600; 710/100; 710/307; 710/309; 710/313; 370/395.21; 370/395.41; 375/240; 455/177.1; 455/452.2

(58) Field of Classification Search ................ 713/500, 713/501, 600; 710/100, 307, 309, 313; 370/395.21, 370/395.41; 375/240; 455/177.1, 452.2
See application file for complete search history.

(56) References Cited

U.S. PATENT DOCUMENTS 5,560,022 A 9/1996 Dunstan et al.
5,630,110 A 5/1997 Mote, Jr.
5,630,148 A 5/1997 Norris
5,664,165 A 9/1997 Curry et al.
5,745,375 A 4/1998 Reinhardt et al.
5,754,867 A 5/1998 Walker (Continued)

FOREIGN PATENT DOCUMENTS

EP 0702308 A1 3/1996

(Continued)

OTHER PUBLICATIONS

GB Search Report. Application No. GB0416739.1. Nov. 9, 2004.

(Continued)

Primary Examiner—Lynne H. Browne
Assistant Examiner—Nitin C. Patel (57) ABSTRACT

A frequency manager automatically selects a clock frequency for each device or bus, or for a plurality of devices or buses, in a system, based on various factors and objectives. These factors and objectives can include optimizing performance of the devices without exceeding the system's power/thermal budget. The frequency manager can then control circuits that generate and provide clock signals having the selected frequency(ies) to these devices or buses. For example, in a system that is less than fully populated with devices, embodiments of the invention can select higher clock frequencies than a fully populated system would utilize. Some embodiments of the invention select higher clock frequencies for high-bandwidth devices than for low-bandwidth devices. Other embodiments use information about application programs that will be executed by systems, such as which devices these application programs will frequently access, to select higher clock frequencies for the frequently accessed devices. Yet other embodiments use information about whether the application programs are more memory or I/O intensive to allocate higher clock frequencies to either memory subsystems or I/O subsystems.

29 Claims, 9 Drawing Sheets

U.S. PATENT DOCUMENTS

| | | | |
|---|---|---|---|
| 5,790,877 A | | 8/1998 | Nishiyama et al. |
| 5,815,734 A * | | 9/1998 | Lee et al. ............... 710/60 |
| 5,918,061 A | | 6/1999 | Nikjou |
| 5,930,496 A * | | 7/1999 | MacLaren et al. ......... 703/23 |
| 6,070,207 A * | | 5/2000 | Bell ..................... 710/302 |
| 6,073,244 A * | | 6/2000 | Iwazaki ................. 713/322 |
| 6,134,621 A * | | 10/2000 | Kelley et al. ........... 710/311 |
| 6,185,692 B1 * | | 2/2001 | Wolford ................. 713/501 |
| 6,211,715 B1 | | 4/2001 | Terauchi |
| 6,295,568 B1 | | 9/2001 | Kelley et al. |
| 6,484,222 B1 * | | 11/2002 | Olson et al. ........... 710/300 |
| 6,510,473 B1 | | 1/2003 | Voit |
| 6,513,124 B1 | | 1/2003 | Furuichi et al. |
| 6,564,279 B1 * | | 5/2003 | Neil et al. ............. 710/302 |
| 6,714,890 B1 * | | 3/2004 | Dai ..................... 702/132 |
| 6,763,478 B1 | | 7/2004 | Bui |
| 6,772,263 B1 * | | 8/2004 | Arramreddy .......... 710/302 |
| 6,782,438 B1 * | | 8/2004 | Duncan et al. ........ 710/104 |
| 6,948,020 B1 * | | 9/2005 | Bonomo et al. ....... 710/300 |
| 6,954,813 B1 * | | 10/2005 | Holley et al. .......... 710/302 |
| 6,963,990 B1 | | 11/2005 | Allen et al. |
| 2004/0139363 A1 | | 7/2004 | Elbe et al. |

FOREIGN PATENT DOCUMENTS

| | | |
|---|---|---|
| EP | 0905630 A2 | 3/1999 |
| EP | 0962867 A2 | 12/1999 |
| WO | WO 95/35540 | 12/1995 |
| WO | WO 02/099664 A1 | 12/2002 |

OTHER PUBLICATIONS

GB Search Report. Application No: GB0417994.1. Dec. 2, 2004.
GB Search Report. Application No. GB0417993.3. Dec. 2, 2004.

* cited by examiner

FIG. 6
APPLICATION PROGRAM INFORMATION

BUS CLOCK FREQUENCY MANAGEMENT BASED ON DEVICE BANDWIDTH CHARACTERISTICS

RELATED APPLICATIONS

The present application is related to the following commonly-owned U.S. patent applications:

U.S. patent application Ser. No. 10/646,079, filed Aug. 22, 2003, entitled "BUS CLOCK FREQUENCY MANAGEMENT BASED ON DEVICE LOAD", naming as inventors Andrew H. Barr, Ricardo Espinoza-Ibarra and Kevin Somervill; and U.S. patent application Ser. No. 10/646,078 filed Aug. 22, 2003, entitled "BUS CLOCK FREQUENCY MANAGEMENT BASED ON CHARACTERISTICS OF AN APPLICATION PROGRAM", naming as inventors Andrew H. Barr, Ricardo Espinoza-Ibarra and Kevin Somervill; both of which are hereby incorporated by reference herein.

BACKGROUND

1. Field of the Invention

The present invention relates generally to apparatus and methods for generating clock signals for computer buses and, more particularly, to such apparatus and methods that select frequencies for these clock signals so as to optimize performance of computer devices without exceeding a computer system's power budget or thermal budget.

2. Related Art

Performance of many electronic devices, such as processors, memory and graphic controllers, depends on clock frequencies at which these devices operate. Such devices are typically connected to buses or other circuits that supply the devices with clock signals. A clock signal is typically a precisely timed train of square-wave pulses. The clock frequency of a bus is commonly referred to its "bus speed", and a time period between two successive clock pulses is commonly referred to as a "clock cycle" or "bus cycle".

A clock signal determines the speed at which a device operates. Typically, a device performs a fixed number of operations per clock cycle. For example, a clock signal determines the frequency at which a processor executes instructions, although some processors internally multiply their clock signals by a fixed factor, such as 4. Similarly, a clock signal determines the frequency with which data can be sent to, or retrieved from, a memory, network interface, disk controller or other peripheral, hence determining the device's "bandwidth". For example, if a memory is capable of accepting or supplying 32 bits (four bytes) of data at one time, and its clock frequency is 200 MHz, then the memory's bandwidth is 4 bytes×200 MHz=800 MBytes/Sec. A similar analysis applies to other devices. Thus, in general, electronic devices deliver higher performance when they operate at higher clock frequencies or bus speeds. Market demands for ever increasing performance levels, coupled with technological advances that enable production of devices that operate at higher clock frequencies, have, over time, led to use of progressively higher device clock frequencies.

Electronic devices consume electricity and dissipate waste heat. Excess heat can damage electronic devices, so these devices must be adequately cooled. Heat dissipation, therefore, poses a problem, especially in high-density systems. Unfortunately, higher clock speeds generally cause electronic devices to consume more electricity and dissipate more heat. For example, whenever a CMOS node (a common component in electronic devices) changes binary state, it must charge or discharge its load capacitance, which causes it to draw electric current or lose some of its stored energy in the form of heat. The rate at which CMOS nodes in an electronic device change states is related to the device's operating frequency, so dynamic power consumption and heat dissipation by such a device are generally proportional to the device's clock frequency.

Systems are typically designed to operate within a power/thermal budget. That is, each system is designed to provide up to a predetermined maximum amount of electrical power to devices within the system and to dissipate up to a predetermined maximum amount of heat generated, in aggregate, by these devices. Systems with expansion slots that can be selectively loaded with zero or more expansion modules, such as PCI slots, AGP slots or memory sockets, are typically designed with a power/thermal budgets that assumes a "worst-case" scenario, i.e. all the expansion slots will be filled. For example, such systems typically include power supplies that can handle the maximum number of expansion modules that can be installed into the expansion slots. In addition, the bus speeds are set such that the systems' thermal budgets will not be exceeded, even if all the expansion slots are filled.

This conservative design philosophy artificially limits clock speeds, and therefore performance, of installed devices, especially when a system is not fully populated with expansion modules. Potential performance by some or all of the installed devices is foregone, because, in a system that is not fully populated with expansion modules, at least some of the installed devices could operate at higher clock frequencies without exceeding the system's power or thermal budget. Thus, although purchasers pay premiums for devices that are capable of high performance, prior art design philosophies prevent these purchasers from fully benefiting from the performance potential of these devices.

SUMMARY OF THE INVENTION

In an aspect of the present invention, a method of determining clock frequencies for first and second electronic devices installed in a system with zero or more other electronic devices, the first electronic device being connected to a first bus and the second electronic device being connected to a second bus is disclosed. The method comprises automatically selecting a first clock frequency for the first electronic device and a second clock frequency for the second electronic device, based at least on information about the first and second electronic devices and the zero or more other electronic devices installed in the system.

In another aspect of the present invention, an article of manufacture is disclosed. The article of manufacture comprises computer-executable instructions capable of determining clock frequencies for first and second electronic devices installed in a system with zero or more other electronic devices, the first electronic device being connected to a first bus and the second electronic device being connected to a second bus. The computer-executable instructions are also capable of automatically selecting a first clock frequency for the first electronic device and a second clock frequency for the second electronic device, based at least on information about the first and second electronic devices and the zero or more other electronic devices installed in the system.

In yet another aspect of the present invention, a frequency manager for determining clock frequencies for first and second electronic devices installed in a system with zero or more other electronic devices, the first electronic device being connected to a first bus and the second electronic device being connected to a second bus is disclosed. The frequency manager comprises a frequency calculator automatically selecting a first clock frequency for the first electronic device and a second clock frequency for the second electronic device, based at least on information about the first and second electronic devices and the zero or more other electronic devices installed in the system. The frequency manager also comprises an interface connected to the frequency calculator, to a first clock signal generator and to a second clock frequency generator. The interface is capable of sending commands to the first clock signal generator to generate clock signals at the first clock frequency and to the second clock frequency generator to generate clock signals at the second clock frequency.

BRIEF DESCRIPTION OF THE DRAWINGS

These and other features and advantages of the present invention, as well as structure and operation of various embodiments of the present invention, are described in detail below with reference to the accompanying drawings. In the drawings, like references numerals indicate identical or functionally similar elements, and the first digit of each reference numeral of each item identifies a figure, in which the item is first introduced.

DETAILED DESCRIPTION

The present invention provides apparatus and methods for determining and controlling clock speed(s) (also herein referred to as "clock frequency(ies)") for one or more devices in a system so as to optimize performance of the devices without exceeding the system's power/thermal budget. The devices can be expansion cards or modules that plug into sockets, discrete or integrated circuits permanently connected to circuit boards or plugged into sockets, daughter cards, processors, memories or the like or combinations thereof. These devices typically connect to buses or other circuits that supply the devices with clock signals (hereinafter collectively referred to as "buses"), which determine the speeds at which these devices operate and, consequently, the amounts of power these devices consume and the amounts of heat these devices dissipate. Embodiments of the invention provide "frequency managers" and related components, as well as methods, to automatically select a clock frequency for each device or bus, or for a plurality of devices or buses, based on various factors and objectives. These frequency managers, related components and methods can then control circuits that generate and provide clock signals having the selected frequency(ies) to these devices or buses.

The factors and objectives can be used to optimize performance of devices in a system beyond what would be attainable using the prior art's conservative "worst-case" design philosophy. For example, in a system that is less than fully populated with devices, embodiments of the invention can select higher clock frequencies than a fully populated system would utilize. Some embodiments of the invention select higher clock frequencies for high-bandwidth devices than for low-bandwidth devices. Other embodiments use information about application programs that will be executed by systems, such as which devices these application programs will frequently access, to select higher clock frequencies for the frequently accessed devices. Yet other embodiments use information about whether the application programs are more memory or I/O intensive to allocate higher clock frequencies to either memory subsystems or I/O subsystems.

An aggregate amount of heat that can be safely dissipated by devices of a system is known as the system's thermal budget. A set of clock speeds that would cause a system's devices, in aggregate, to dissipate an amount of heat equal to the system's thermal budget can be thought of as the system's "clock speed budget". Because a device's heat dissipation is proportional to its clock speed, a system's thermal budget is equivalent to its clock speed budget. Like a thermal budget, a clock speed budget can be allocated among the devices of a system. That is, different devices can be operated at different clock speeds. Individual devices can be operated at relatively higher or lower clock speeds and, therefore, consume more or less of the system's thermal or clock speed budget, but the sum of the consumptions by all the devices should not exceed the budget The total amount of electrical power that can be supplied by a system to its devices is known as the system's power budget. Because a device's power consumption is proportional to its clock speed, clock speeds of devices in a system should be selected so the devices, in aggregate, do not exceed the system's power budget.

A system's power budget can be greater than or less than its thermal budget, depending on the relative capacities of the system's power supply and its cooling system. Therefore, absent an assumption that one of these budgets exceeds the other, preferably both a system's thermal budget and its power budgets should be considered when determining clock speeds at which the system's devices should operate. Embodiments of the present invention essentially allocate a portion of a system's thermal budget, power budget or both to each device or bus, or to one or more groups of devices or buses, by specifying a clock speed for the device(es), bus(es) or group(s).

For purposes of providing an example, the present invention is described in the context of a general-purpose computer, such as one that can be used as a server or workstation. One of ordinary skill in the art can, however, apply the teachings herein to other situations in which devices, memory units or buses operate at clock frequencies examples of which are provided above and below.

Figure 1A:
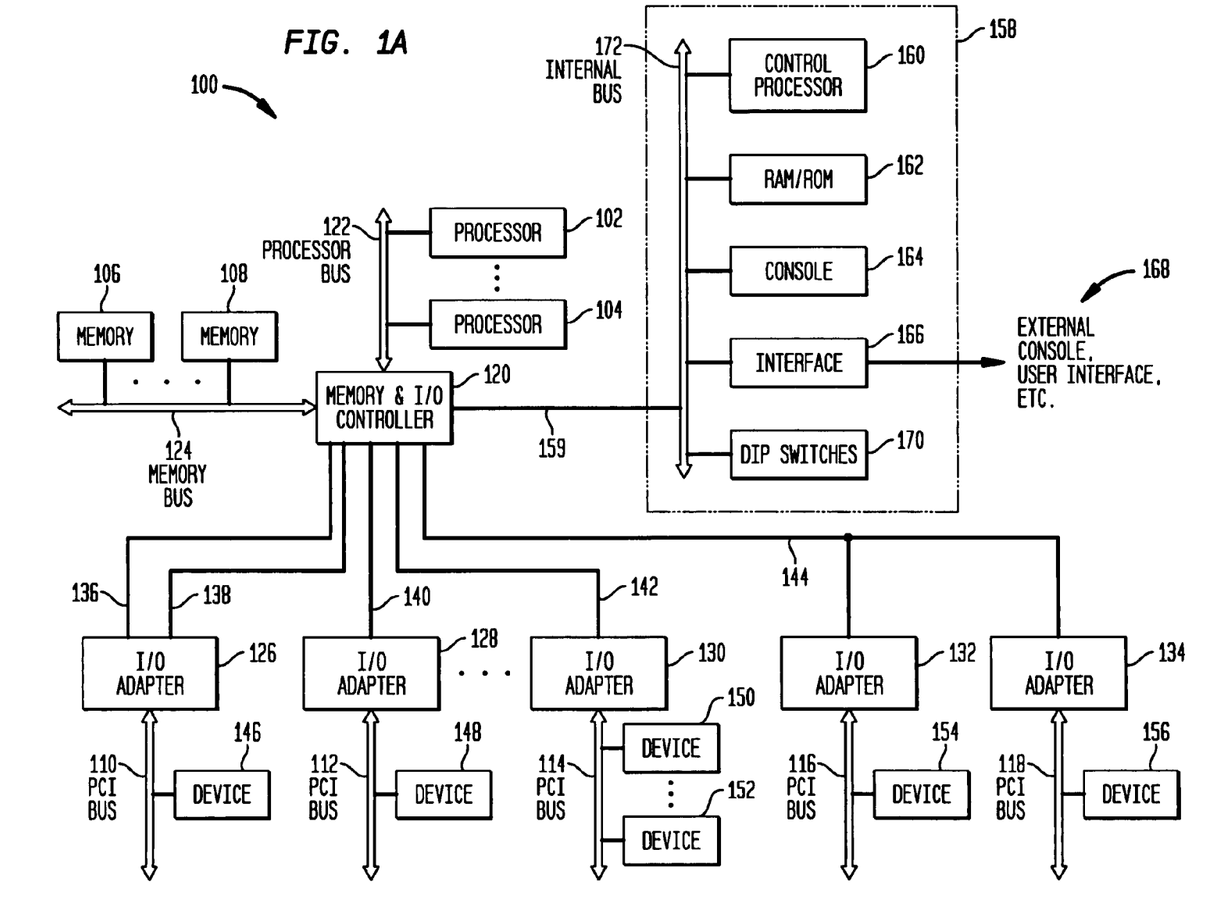
FIG. 1A is a block diagram of an exemplary computer, in which aspects of the present invention can be implemented, and a block diagram of a first implementation of a frequency manager, according to the invention.

FIG. 1A contains a block diagram of an exemplary computer 100 to illustrate how an embodiment of the present invention can be advantageously practiced. The computer 100 includes one or more processors 102 and 104, one or more memory units 106 and 108 and one or more PCI buses 110, 112, 114, 116 and 118, all interconnected by a memory and I/O controller 120. The processors 102 and 104 are preferably connected to the memory and I/O controller 120 by a processor bus 122 (sometimes referred to as a "front-side bus").

The memory units 106 and 108 are preferably connected to the memory and I/O controller 120 by a memory bus 124. The memory units 106 and 108 can be permanently connected to the memory bus 124, or they can be connected to the bus via sockets. Although only one memory bus 124 is shown, it is possible to have more than one memory bus, with its attendant memory units, connected to the memory and I/O controller 120. Similarly, although the memory bus 124 is shown with two memory units 106 and 108 connected thereto, more or fewer memory units can be connected to any of the memory buses.

Each PCI bus 110–118 is preferably connected to the memory and I/O controller 120 by an I/O adapter 126, 128, 130, 132 and 134 (respectively) and a synchronous bus 136, 138, 140, 142 and 144 (respectively). As shown in FIG. 1A, some I/O adapters, such as I/O adapter 126, can be connected to the memory and I/O controller 120 by more than one synchronous bus, such as synchronous buses 136 and 138, to provide a higher bandwidth path between the I/O adapter and the memory and I/O controller. Also as shown in FIG. 1A, some I/O adapters, such as I/O adapters 132 and 134, can share a synchronous bus, such as synchronous bus 144. Although the computer system 100 uses intermediate units, such as the I/O adapters 126–134 and the synchronous buses 136–144, between the PCI buses 110–118 and the memory and I/O controller 120, it is acceptable for the PCI buses to be connected directly to the memory and I/O controller. Although the buses 110–118 are shown as PCI buses, other standard or proprietary bus architectures, such as AGP or SCSI, can be used.

FIG. 1A also shows devices 146, 148, 150, 152, 154 and 156 connected to the PCI buses 110–118. These devices 146–156 are typically I/O devices, such as network interfaces and disk controllers, but they can also be processors, memories or any other type of device that can be connected to the PCI buses 110–118. The devices 146–156 can be permanently connected to their respective PCI buses 110–118, or the devices can be connected to the respective PCI buses via sockets or by a combination of permanent connections and sockets. As shown in FIG. 1A, some PCI buses, such as PCI buses 110, 112, 116 and 118, have only one device attached to each of them. PCI bus 114, on the other hand, has more than one device 150 and 152 connected thereto. High-performance computer systems, such as servers, often have only one device per bus.

The memory and I/O controller 120 generates clock signals for the memory bus 124 and the synchronous buses 136–144. The I/O adapters 126–134 use the clock signals received over their respective synchronous buses 136–144 to generate clock signals for their respective PCI buses 110–118. Generally, the I/O adapters 126–134 generate the clock signals for the PCI buses 110–118 by multiplying the clock signals received over the respective synchronous buses 136–144 by a multiplier, which can be more than, less than or equal to one. Alternatively, the I/O adapters 126–134 can generate clock signals for the PCI buses 110–118 without using clock signals from the synchronous buses 136–144. For example, the I/O adapters 126–134 can use crystal oscillators, frequency synthesizers or other appropriate circuits.

As described thus far, the computer 100 is conventional. Such a computer is available from Hewlett-Packard, Palo Alto, Calif., under the trade name HP server rx5670 or HP server rx2600, and the memory and I/O controller 120 and the I/O adapters 126–134 are available under the trade name HP zxl chipset. Although the computer 100 is shown with a single monolithic memory and I/O controller 120, components of the memory and I/O controller could be implemented as separate circuits. For example, separate discrete or integrated circuits could be used to generate the clock signals for each of the various buses 110–118 and 124.

Figure 2:
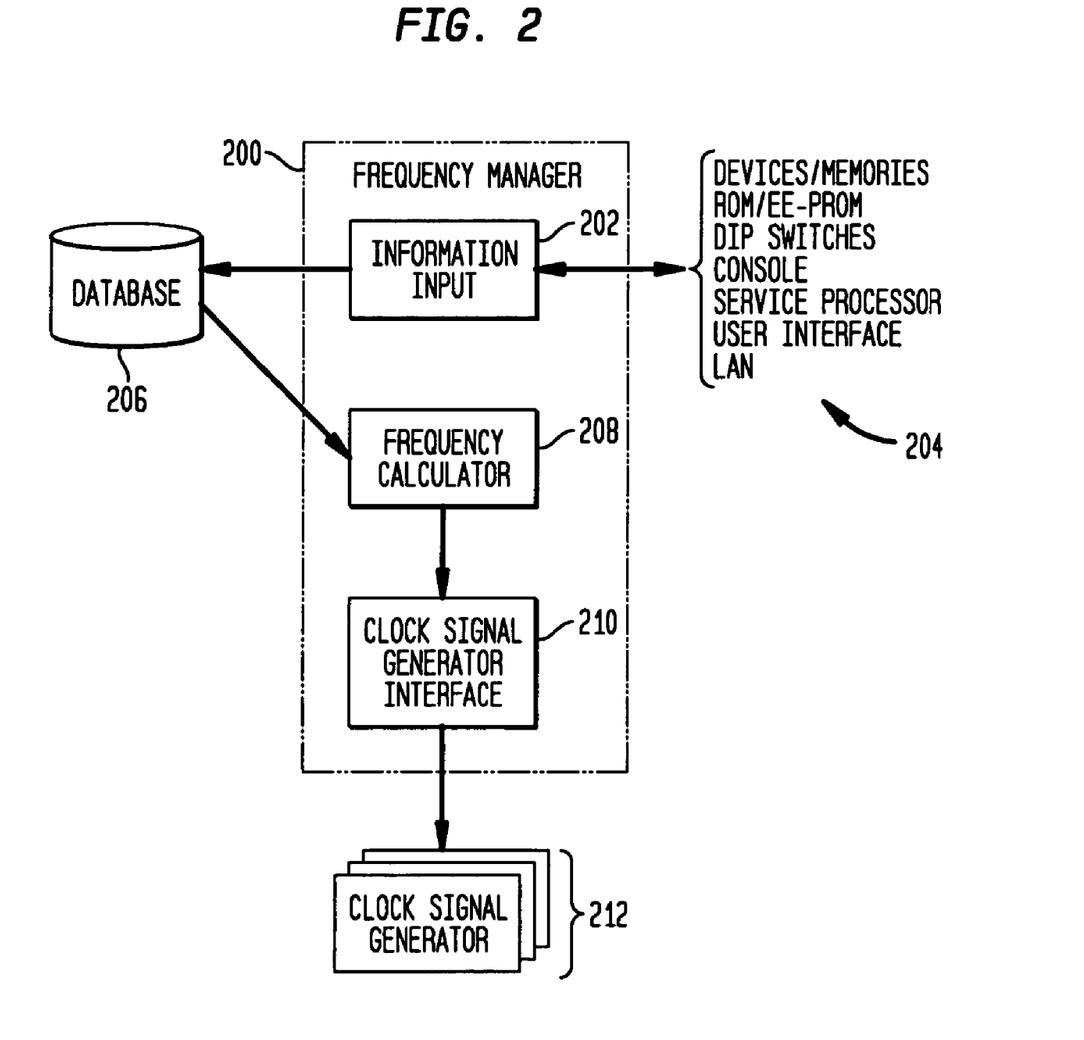
FIG. 2 is a block diagram of an exemplary embodiment of a frequency manager, according to the invention.

FIG. 2 is a block diagram of one embodiment of a frequency manager 200 that can be used in a computer, such as the computer 100 described in FIG. 1A. The frequency manager 200 includes an information input 202, which obtains information about the computer and devices and/or memories connected to the computer, as described in more detail below. The information input 202 can be connected directly or indirectly connected to the devices and/or memories, a ROM/EE-PROM, console, service processor, user interface and/or LAN (collectively 204), by which the information input can obtain this information. The information gathered by the information input 202 is stored in a database 206, which can be, for example, a RAM. A frequency calculator 208 uses the information stored in the database 206 to calculate one or more bus frequencies for the devices and/or memories, as described in more detail below. A clock signal generator interface 210 interconnects the frequency manager 200 with one or more clock signal generators 212 to set the frequency(ies) of clock signals generated by the clock signal generators.

FIG. 1A shows one implementation of a frequency manager 158 connected to the memory and I/O controller 120 via a connection 159. The frequency manager 158 can query the devices 146–156, the memory units 106 and 108 or a database to obtain information about the devices or memory units, as described in more detail below. Based on this information, the frequency manager 158 can control the frequencies of the clock signals generated for the PCI buses 110–118 and the memory bus 124. The one or more devices or memory units connected to the PCI buses 110–118 and the memory bus 124 operate at the frequencies of the clock signals of their respective buses.

The embodiment of the frequency manager 158 shown in FIG. 1A can include: a control processor 160, which can be a microprocessor; RAM and/or ROM 162; an optional console 164 and/or an interface 166 to an external console, user interface or the like 168; and optional DIP switches 170; all interconnected by an internal bus 172. The frequency manager 158 can be implemented as software or firmware instructions stored in the RAM/ROM 162, executed by the processor 160 and controlling other components, as described above and below. The frequency manager 158 can share the hardware components 160–172 with other functions. For example, these hardware components 160–172 can also perform power-on self-test ("POST") functions or implement a service processor.

The frequency manager 158 can send commands and queries to the memory and I/O controller 120 via the connection 159. These queries can be used to obtain information about the devices 146–156 and the memory units 106–108. The frequency manager 158 can also obtain this information automatically or through user input, as described in more detail below. The frequency manager 158 can store information about the devices 146–156 and the memory units 106–108 in the RAM 162.

The commands can be used to specify frequencies of clock signals generated by the memory and I/O controller 120 for the synchronous buses 136–144 and the memory bus 124. Alternatively or in addition, the memory and I/O controller 120 can forward appropriate ones of these commands and queries, over the synchronous buses 136–144, to the I/O adapters 126–134, and, when necessary, through the I/O adapters to the devices 146–156. Similarly, the memory and I/O controller 120 can forward appropriate ones of these commands and queries over the memory bus 124 to the memory units 106–108. These forwarded commands can be used to instruct the I/O adapters 126–134 to generate clock signals of specified clock frequencies. For example, these commands can specify multipliers to be applied to the respective synchronous bus 136–144 clock signals. As previously described, the I/O adapters 126–134 apply multipliers to clock signals received over the synchronous buses 136–144 to generate clock signals for the PCI buses 110–118. Alternatively, these commands can explicitly specify frequencies of clock signals to be generated by the I/O adapters 126–134 using local clock signal generators.

Figure 1B:
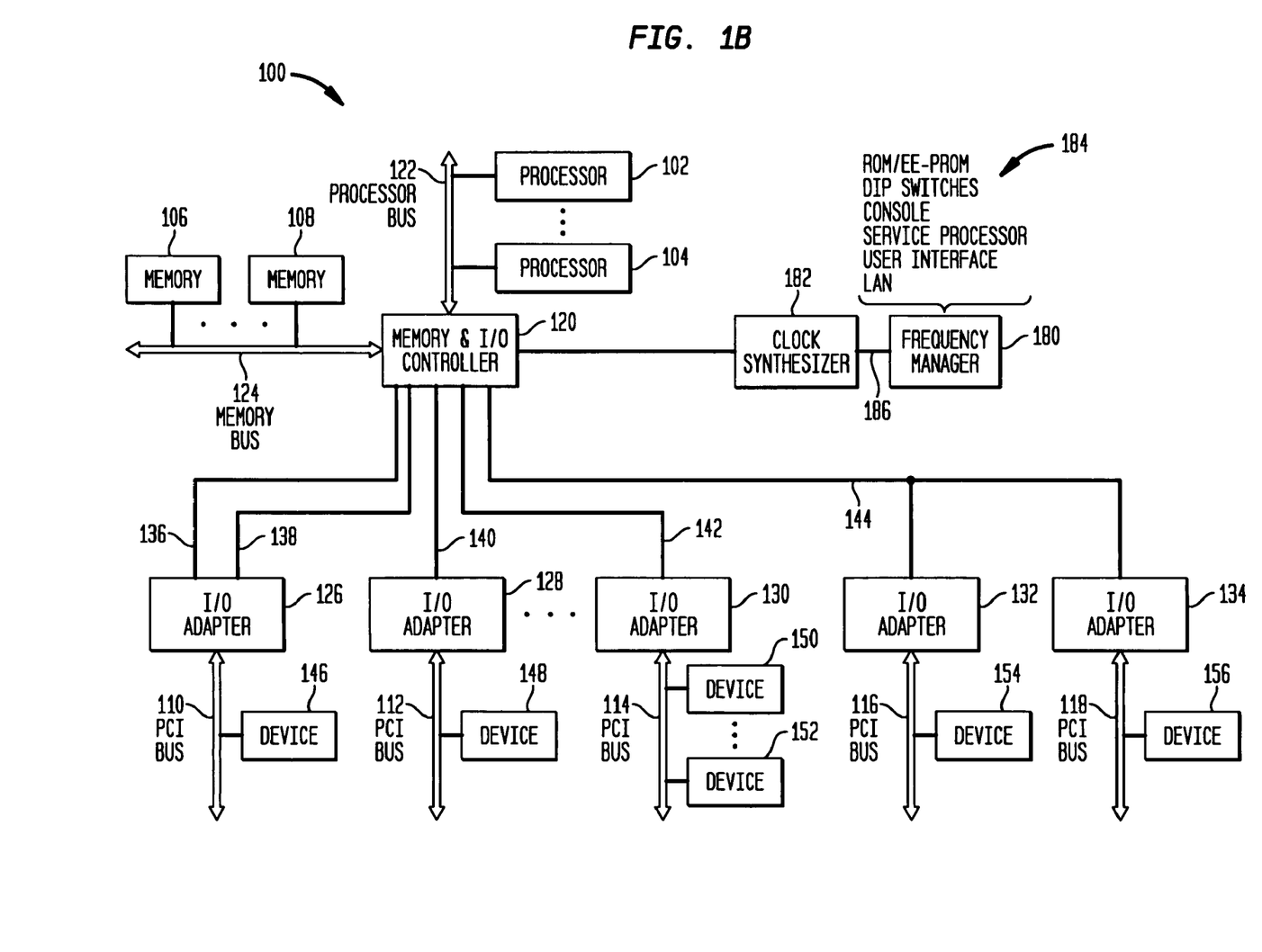
FIG. 1B is a block diagram of an exemplary computer, in which aspects of the present invention can be implemented, and a block diagram of a second implementation of a frequency manager, according to of the invention.

FIG. 1B shows an alternative implementation of the frequency manager 180 connected to a clock synthesizer 182, which in turn is connected to the memory and I/O controller 120. In this embodiment, the frequency manager 180 is implemented as a dedicated- or shared-purpose integrated circuit, such as a microprocessor/memory combination, ASIC, FPGA or the like or a combination of integrated circuits. The frequency manager 180 can receive input from any combination of a ROM/EE-PROM, DIP switches, console, service processor, user interface or LAN (collectively 184). As in the embodiment described with reference to FIG. 1A, the frequency manager 180 can communicate, through the clock synthesizer 182, with the memory and I/O controller 120 and I/O adapters 126–134 to query the devices 146–156 and the memory units 106–108, specify multipliers, etc.

The clock synthesizer 182 can, for example, be implemented as conventional clock signal generator controlled by an I2C I/O expander, and this I2C expander can communicate with the frequency manager 180 over an I2C bus 186. In this embodiment, the memory and I/O controller 120 does not include an internal clock signal generator. Instead, the memory and I/O controller 120 receives a clock signal generated by the clock synthesizer 182, and the memory and I/O controller uses this clock signal to generate clock signals for the memory bus 124 and the synchronous buses 136–144.

As previously mentioned, the frequency manager 158 or 180 automatically selects a clock frequency for each device 146–156, PCI bus 110–118 or memory bus 124, or for a plurality of these devices or buses, based on various factors and objectives. (For simplicity, the remaining explanation will be given with reference to frequency manager 158. The explanation does, however, also apply to the frequency manager 200.) These factors can include: number of devices or buses managed by the frequency manager; heat-dissipation characteristics of the devices or memory units, particularly as these characteristics relate to clock speeds at which these devices or memory units operate, i.e. how much heat these devices or memory units dissipate when operated and various clock speeds; typical, minimum and maximum bandwidth requirements of the devices or memory units; power consumption characteristics of the devices or memory units; and characteristics of an application program that is to be executed by a system that includes the devices or memory units, such as which device(s) the application program will use, how much memory the application program requires and whether the application program is more memory or I/O intensive. Embodiments of the frequency manager 158 can obtain this and other information about the devices 146–156 and the memory units 106–108 by various techniques, as described below.

Figure 3:
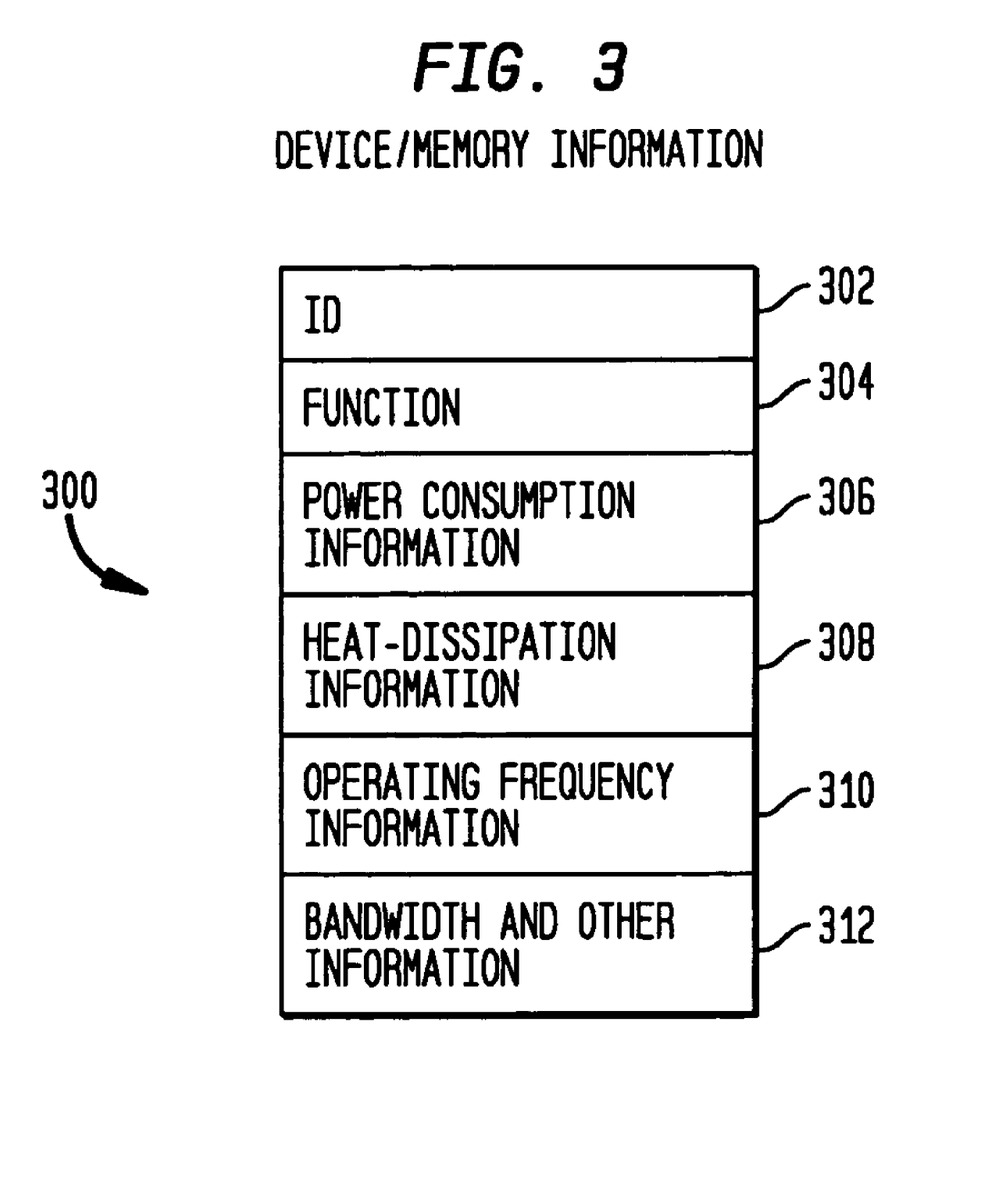
FIG. 3 is a diagram of an exemplary device/memory information data structure used by embodiments of the present invention.

FIG. 3 is a diagram of an exemplary data structure 300 used by the frequency manager 158 to store information about one of the devices 146–156 or memory units 106–108, for which the frequency manager 158 can select a clock frequency. The frequency manager 158 stores these data structures in the RAM 162.

Field 302 contains an identification of the device or memory unit. Field 304 contains information about the device's or memory unit's function. For example, this information can indicate that the device or memory unit is a network interface, disk controller, graphic controller, processor or memory. Field can 306 contain information about power consumption characteristics of the device or memory unit. This can include minimum, average and maximum power consumption, as well as power consumption correlated to clock frequency. This correlation can be in the form of, for example, a table or formula. Field can 308 contain information about heat dissipation characteristics of the device or memory unit. This can include minimum, average and maximum heat dissipation, as well as heat dissipation correlated to clock frequency. This correlation can be in the form of, for example, a table or formula. Field 310 can contain operating frequency information. This can include minimum, average and maximum clock frequencies, at which the device or memory unit can operate. Field 312 can contain bandwidth and other information. For example, this can include: connection speeds, at which network interfaces can operate; storage capacities of memory units; and maximum transfer rates of disks.

Embodiments of the frequency manager 158 can obtain information about the devices 146–156 and the memory units 106–108 by various techniques. For example, during power-on self-test ("POST") the frequency manager 158 can query registers or storage locations in the devices 146–156 and the memory units 106–108, as previously described. Alternatively, BIOS instructions executed by the processor 160 or by the devices 146–156 and the memory units 106–108 can collect this information and report it to the frequency manager 158 or store it in a location that is subsequently accessible by the frequency manager, such as the RAM 162. Additionally or alternatively, the frequency manager 158 can obtain this information from the RAM/ROM 162, the console 164 or the DIP switches 170. The ROM 162 can, for example, include information that was stored therein during manufacture of the computer 100. Additionally, a user or an automated system can supply this information to the frequency manager 158 through the external interface 168. Similarly, the frequency manager 158 can obtain information about the computer's 100 power and/or thermal budget and store this information in the RAM 162.

Using the information the frequency manager 158 obtains about the devices 146–156 and the memory units 106–108, the frequency manager can select clock frequencies for the PCI buses 110–118 and the memory bus 124 and, consequently, for the devices 146–156, according to various objectives. The objectives can include operating all the devices at a single clock frequency, the clock frequency being chosen to be the highest clock frequency possible (or a convenient clock frequency below this highest possible clock frequency), without exceeding the system's power budget and/or thermal budget.

To achieve this objective, the frequency manager 158 can access information about the devices 146–156 and the memory units 106–108 stored in the data structures 300 and calculate this clock frequency. For example, the frequency manager can select an arbitrary clock frequency and calculate a corresponding aggregate power consumption and/or heat dissipation of the devices 146–156 and the memory units 106–108, if these devices and memory units were to be operated at the selected clock frequency. The frequency manager 158 can then compare the calculated aggregate power consumption and/or heat dissipation with the system's power budget and/or thermal budget. If the calculated aggregate power consumption and/or heat dissipation exceeds the corresponding budget, the frequency manager 158 can iteratively select lower clock frequencies and repeat the calculations until it finds a clock frequency that does not exceed the budget(s). On the other hand, if the calculated aggregate power consumption and/or heat dissipation does not exceed the corresponding budget, the frequency manager 158 can iteratively select higher clock frequencies and repeat the calculations until it finds a clock frequency that exceeds the budget and select a lower clock frequency. Alternatively, instead of an iterative approach, the frequency manager 158 can use formulas that correlate power consumption and/or heat dissipation with operating frequency and solve these equations for an optimum clock frequency.

Alternatively, the frequency manager 158 can divide the system's thermal budget, power budget, or the smaller of the thermal and power budget, by the total number of devices 146–156 and memory units 106–108 to calculate a thermal budget or power budget for each device and memory unit. Using information about the heat dissipation and/or power consumption of each device 146–156 and memory unit 106–108, in relation to the respective device's or memory unit's operating frequency, the frequency manager 158 can then calculate one clock frequency, at which to operate all the devices and memory units that, on average, does not exceed the devices' or memory units' thermal budgets. Alternatively, the frequency manager 158 can calculate separate clock frequencies for each of the devices 146–156 and memory units 106–108 based on the respective device's and memory unit's thermal budget.

Once the frequency manager 158 selects a clock frequency, the frequency manager can send commands to the memory and I/O controller 120 to set the clock frequency of the synchronous buses 136–144 and/or the memory bus 124, as previously described. Alternatively, the frequency manager 158 can send commands to the I/O adapters 126–134 to the set the clock frequencies of the PCI buses 110–118, as previously described. In either case, the clock frequency for the memory bus 124 need not be the same as the clock frequency for the PCI buses 110–118.

Figure 4:
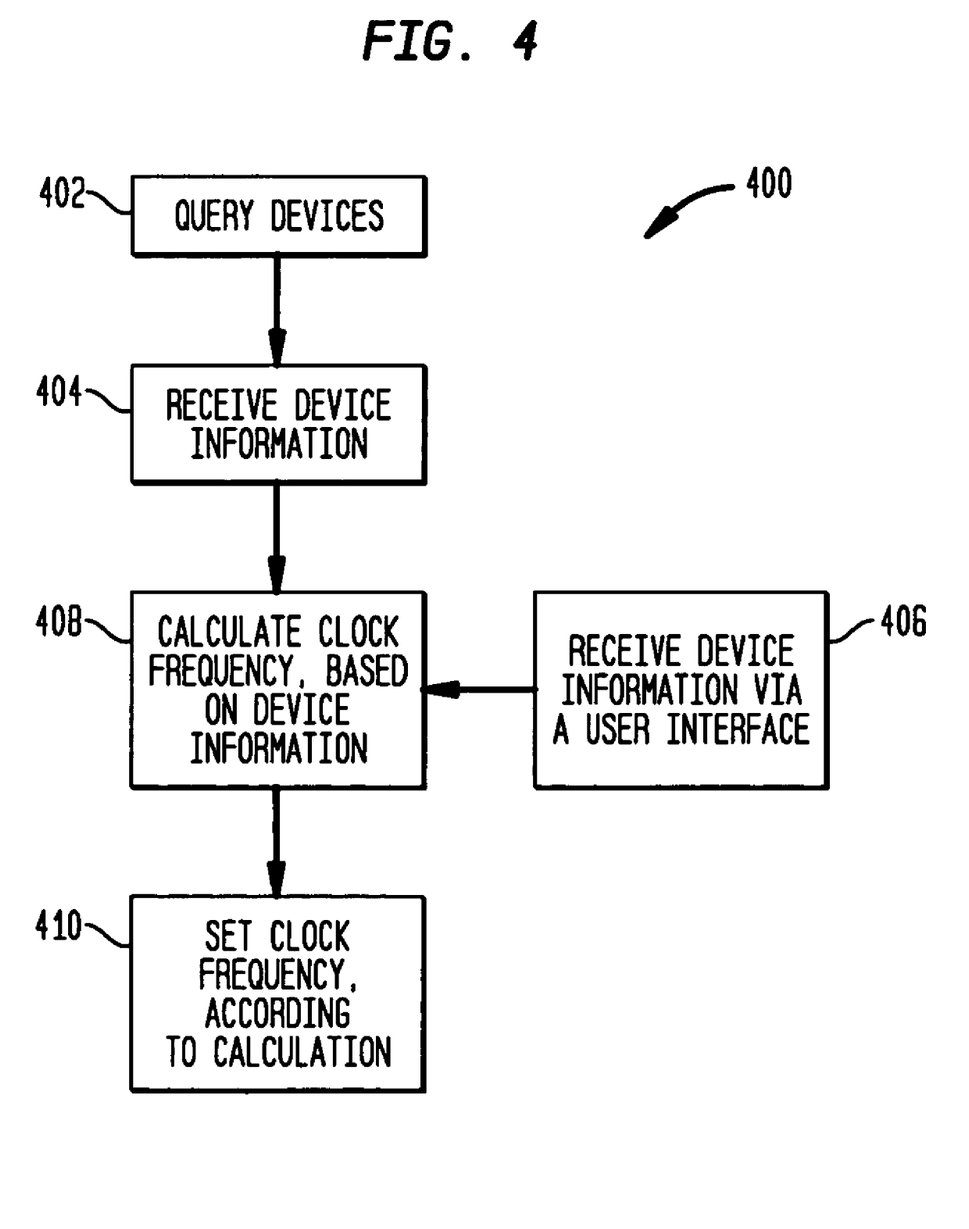
FIG. 4 is an exemplary flowchart illustrating operation of one embodiment of the present invention.

FIG. 4 is a flowchart 400 of an embodiment of the present invention. At 402, the devices are queried to obtain information about their power consumption and/or heat dissipation characteristics. At 404, this information is received. Alternatively, as indicated at 406, this information can be obtained of through a user interface. Alternatively, as previously described, this information can also be obtained from a RAM or a ROM. At 408, a clock frequency is calculated based on this information. This clock frequency can be, for example, the highest clock frequency at which the devices can operate without exceeding a system's power budget and/or thermal budget. At 410, hardware, firmware or software is set to generate clock signals according to the calculated frequency.

Another objective, according to which the frequency manager 158 can select bus frequencies for the PCI buses 110–118 and the memory bus 124, is to allocate a system's power budget and/or thermal budget among its devices in proportion to the devices' respective bandwidth requirements, i.e. operating high-bandwidth devices at higher clock speeds than low-bandwidth devices. To achieve this objective, the frequency manager 158 can select a high clock frequency, at which the devices 146–156 and/or the memory units 106–108 can operate without exceeding the system's power or thermal budget, as described above. The frequency manager 158 can then adjust the clock frequencies of the PCI buses 110–118 and/or the memory bus 124, based on the bandwidth requirements of the respective devices 146–156 and memory units 106–108. For example, the frequency manager 158 can calculate an average bandwidth requirement of all the devices 146–156 and the memory units 106–108. Then, for devices whose bandwidth requirements are above or below this average, the frequency manager 158 can increase or decrease the clock frequencies of their respective PCI buses 110–118 in proportion to the difference between the devices' bandwidth requirements and the average bandwidth requirement.

Once the frequency manager 158 selects these clock frequencies, the frequency manager can send commands to the memory and I/O controller 120 or to the I/O adapters 126–134 to the set the clock frequencies of the PCI buses 110–118 and the memory bus 124, as previously described. In either case, the clock frequency for the memory bus 124 need not be the same as the clock frequency for the PCI buses 110–118.

Figure 5:
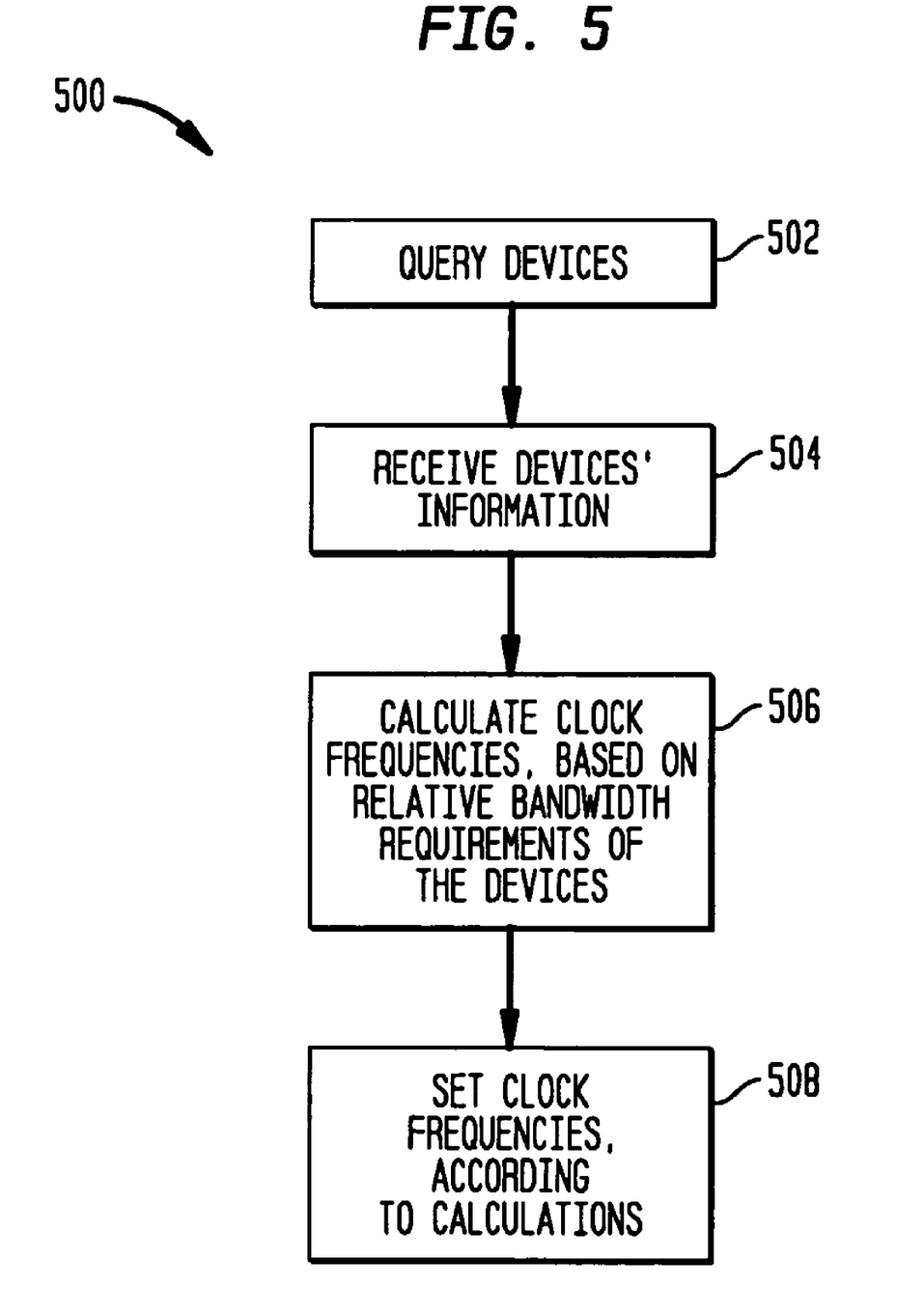
FIG. 5 is an exemplary flowchart illustrating operation of another embodiment of the present invention.

FIG. 5 is a flowchart 500 of an embodiment of the present invention. At 502, the devices are queried to obtain information about their power consumption and/or heat dissipation characteristics. At 504, this information is received. Alternatively, as previously described, this information can also be obtained from a RAM or a ROM. At 506, clock frequencies are calculated based on this information. These clock frequencies can be, for example, the highest clock frequency at which these devices can operate without exceeding a system's power budget and/or thermal budget, adjusted for the relative bandwidth requirements of the devices. At 508, hardware, firmware or software is set to generate clock signals according to these calculated frequencies.

Another objective, according to which the frequency manager 158 can select bus frequencies for the PCI buses 110–118 and the memory bus 124, is to allocate a system's power budget or thermal budget in proportion to expected demands by an application program, i.e. operating often accessed devices at higher clock speeds than less often accessed devices. To achieve this objective, the frequency manager 158 can select a high clock frequency, at which the devices 146–156 and/or the memory units 106–108 can operate without exceeding the system's power or thermal budget, as described above. The frequency manager 158 can then adjust the clock frequencies of the PCI buses 110–118 and/or the memory bus 124, based on which devices or memory units the application program will access often or, alternatively, the bandwidth requirements of these often accessed devices or memory units. For example, the frequency manager 158 can ignore devices or memory units that the application program will not access and select a high clock frequency, at which the remaining devices 146–156 and/or the memory units 106–108 can operate without exceeding the system's power or thermal budget, as described above. This could result in supplying no clock signal to unused devices. Alternatively, the frequency manager 158 can allocate a minimal clock frequency to infrequently accessed devices and/or unused devices and allocate high clock frequencies to the frequently accessed devices. Alternatively, the clock frequencies for the often accessed devices can be allocated in proportion to their respective bandwidth requirements, as described above.

Figure 6:
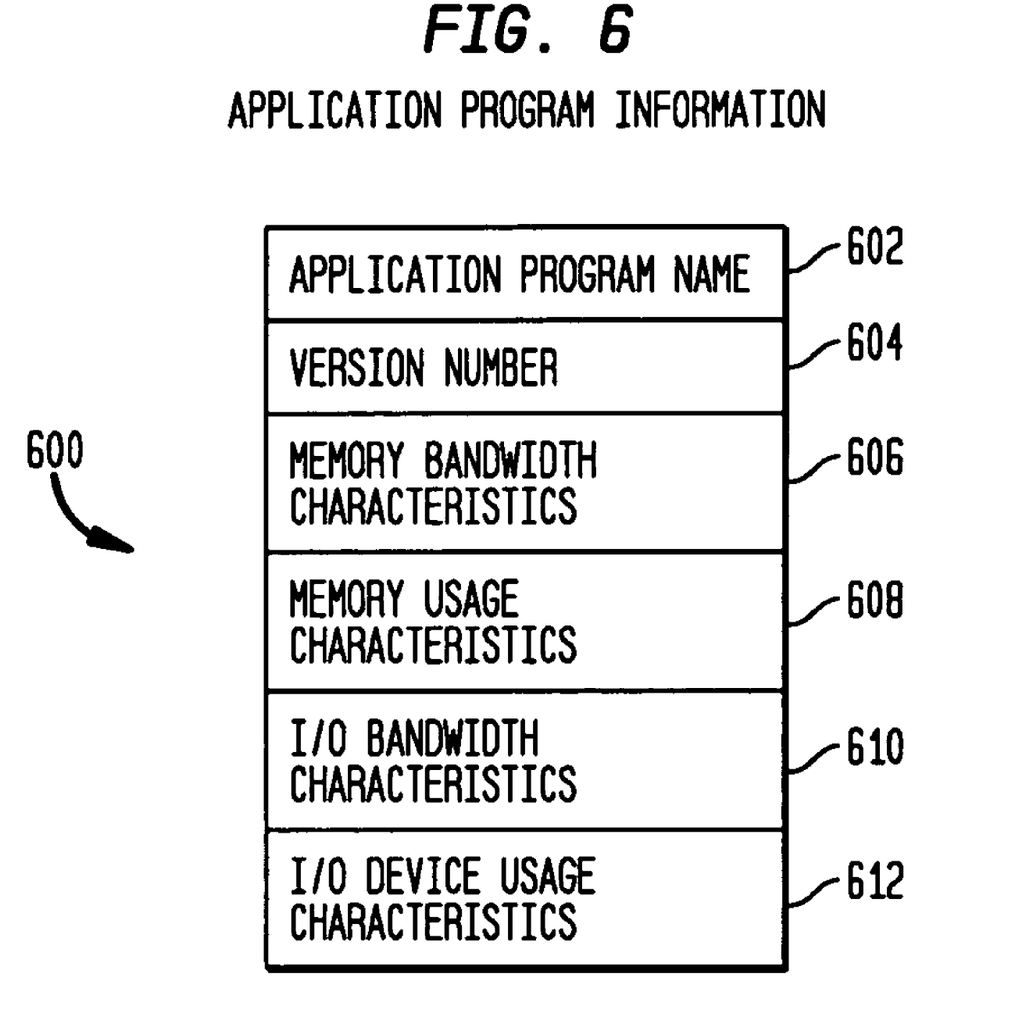
FIG. 6 is a diagram of an exemplary application program information data structure used by embodiments of the present invention.

FIG. 6 illustrates an exemplary data structure 600 that the frequency manager 158 can use to maintain application program information. This data structure 600 can be stored, for example, in the RAM 162. Information for the data structure 600 can be obtained from the RAM/ROM 162, the console 164, the DIP switches 170 or the external interface 168. For example, a separate application program analyzer can analyze an application program and provide this information to the frequency manager 158, e.g. through the external interface 168. Alternatively or additionally, an operating system, under which the application program runs, can provide this information.

Field 602 contains an application program name. Field 604 contains a version number of the application program. Field 606 contains information about the application program's memory bandwidth characteristics, such as information about how intensely the application program will access memory. Field 608 contains information about the application program's memory usage characteristics, such as the amount of memory required by the application program. Field 610 contains information about the application program's I/O bandwidth characteristics, such as information about how intensely the application program will utilize I/O devices. Field 610 contains information about the application program's I/O device usage characteristics, such as an identity of each of the devices the application program will access and an intensity with which the application program will access the device.

Figure 7:
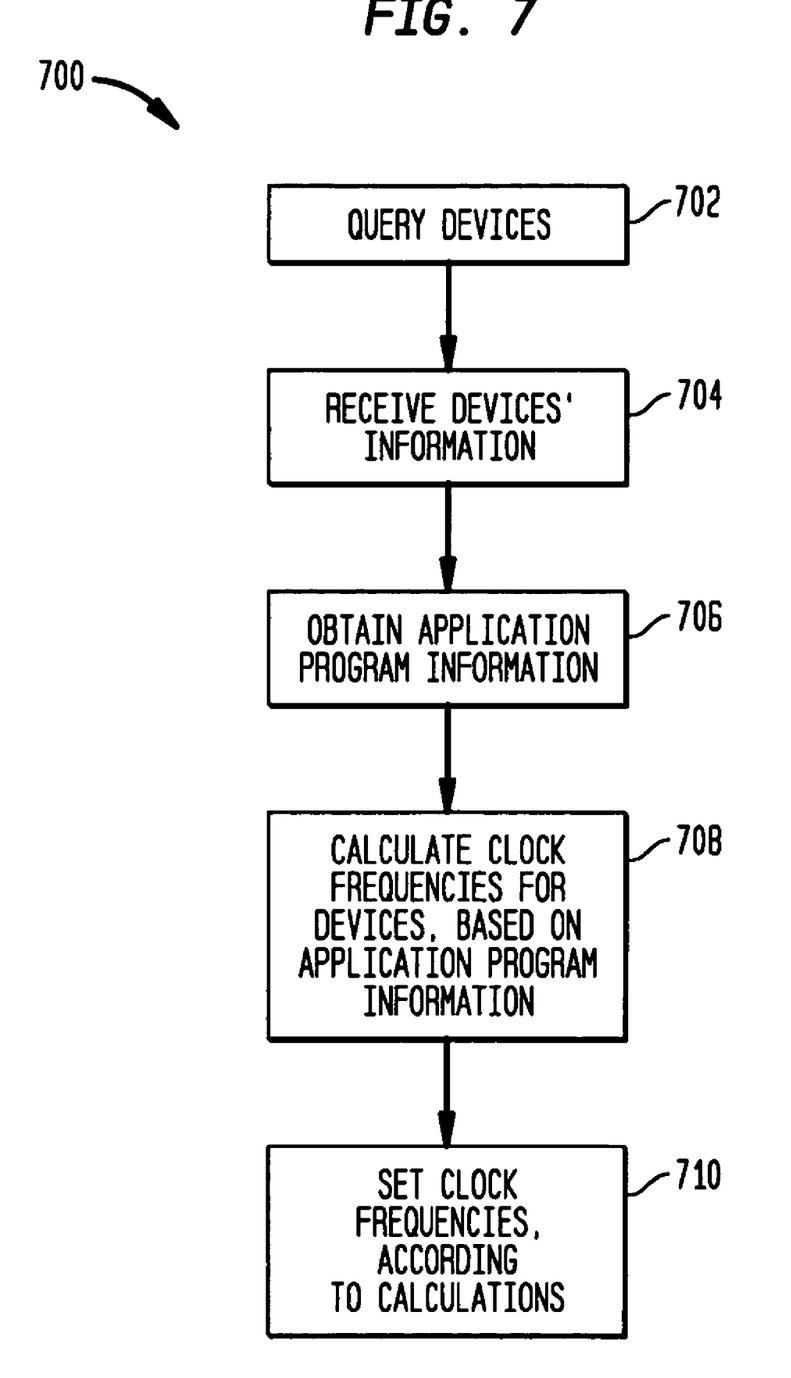
FIG. 7 is an exemplary flowchart illustrating operation of another embodiment of the present invention.

FIG. 7 is a flowchart 700 of an embodiment of the present invention. At 702, the devices are queried to obtain information about their power consumption and/or heat dissipation characteristics. At 704, this information is received. Alternatively, as previously described, this information can also be obtained from a RAM or a ROM. At 706, information about the application program is obtained. At 708, clock frequencies are calculated based on the information about the devices and the application program. These clock frequencies can be, for example, the highest clock frequencies at which devices accessed by the program can operate without exceeding a system's power budget and/or thermal budget, adjusted for the relative bandwidth requirements of the devices. At 710, hardware, firmware or software is set to generate clock signals according to these calculated frequencies.

Another objective, according to which the frequency manager 158 can select bus frequencies for the PCI buses 110–118 and the memory bus 124, is to allocate a system's power budget and/or thermal budget in proportion to expected demands by an application program, i.e. operating memories at relatively higher or lower clock speeds (and operating I/O devices at relatively lower or higher clock speeds), depending on the relative loads placed on these items by the application program. Information about the relative loads placed on these items by the application program can be obtained from, for example, data structure 600. This objective essentially trades memory performance for I/O performance, or vice versa, depending on the expected demands of the application program.

To achieve this objective, the frequency manager 158 can select clock frequencies for the PCI buses 110–118 and/or the memory bus 124, based on which devices or memory units the application program will access often or, alternatively, the bandwidth requirements of these often accessed devices or memory units, as previously described. The frequency manager 158 can then further adjust the clock frequencies. For example, if the application program is memory intensive, the frequency manager 158 can increase the clock frequency for the memory bus 124 and decrease the clock frequencies for the PCI buses 110–118. On the other hand, if the application program is I/O intensive, the frequency manager 158 can decrease the clock frequency for the memory bus 124 and increase the clock frequencies for the PCI buses 110–118.

Figure 8:
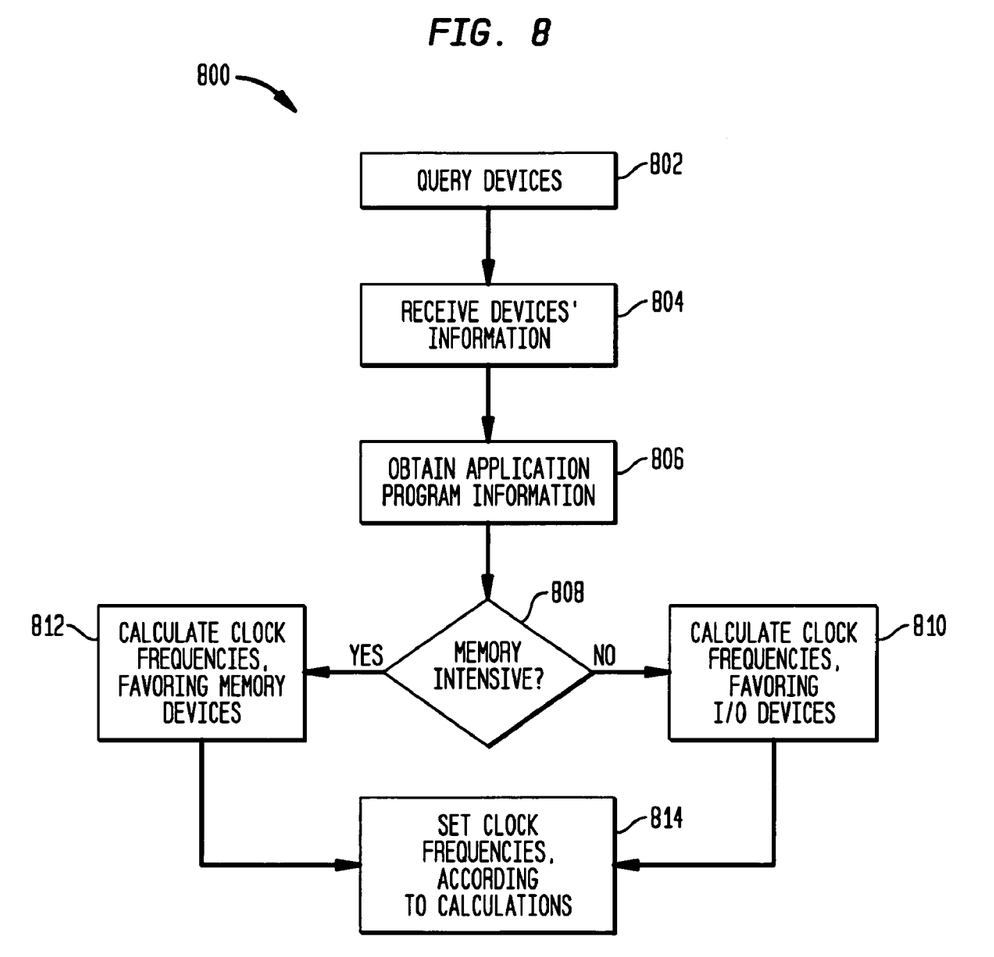
FIG. 8 is an exemplary flowchart illustrating operation of yet another embodiment of the present invention.

FIG. 8 is a flowchart 800 of an embodiment of the present invention. At 802, the devices are queried to obtain information about their power consumption and/or heat dissipation characteristics. At 804, this information is received. Alternatively, as previously described, this information can also be obtained from a RAM or a ROM. At 806, information about the application program is obtained. At 808, if the application program is memory intensive, control passes to 810, otherwise control passes to 812. At 810, clock frequencies are calculated based on the information about the devices and the application program, favoring the I/O devices, i.e., allocating higher clock frequencies to I/O devices, and lower clock frequencies to memory units, than would otherwise be done. At 812, clock frequencies are calculated based on the information about the devices and the application program, favoring the memory units, i.e. allocating higher clock frequencies to memory units, and lower clock frequencies to I/O devices, than would otherwise be done. These clock frequencies can be, for example, the highest clock frequency at which devices accessed by the program can operate without exceeding a system's power budget and/or thermal budget, adjusted for the relative bandwidth requirements of the devices and favoring I/O devices or memory units, depending on characteristics of the application program. At 814, hardware, firmware or software is set to generate clock signals according to these calculated frequencies.

Although the present invention has been described in the context of a computer 100 that includes PCI buses 110–118, PCI devices 146–156, a memory bus 124 and memory units 106–108, in other practices of the invention, inventive apparatus and methods according to the invention can select frequencies for clock signals used in other clocked buses and for other clocked devices, including memories, processors and I/O devices.

The frequency manager and other aspects of the present invention are preferably implemented in software or firmware than can be stored in a memory and control operation of a control processor, as described above, or a computer, such as a personal computer or a microprocessor embedded in another system. The memory can, but need not, be part of an integrated circuit that includes the microprocessor. The software or firmware can be stored on a removable or fixed computer-readable medium, such as a CD-ROM, CD-RW, DVD-ROM, DVD-RW, ZIP disk, hard disk or floppy disk. In addition, this software or firmware can be transmitted over a wireless or wired communication link, such as a computer or telephone network. Alternatively, the frequency manager and other aspects of the present invention can be implemented in hardware, such as an application-specific integrated circuit (ASIC) or a field-programmable gate array (FPGA).

The terms and expressions employed herein are used as terms of description, not of limitation. There is no intention, therefore, in using these terms and expressions to exclude any equivalents of the features shown or described or portions thereof. Practitioners in the art will recognize further features and advantages of the invention based on the above-described embodiments and that other modifications are possible within the scope of the invention claimed. Accordingly, the invention is not to be limited by what has been particularly shown and described, except as indicated by the appended claims. All publications and references cited herein are expressly incorporated herein by reference in their entity.

What is claimed is:

1. A method of determining clock frequencies for first and second electronic devices installed in a system with zero or more other electronic devices, the first electronic device being connected to a first bus and the second electronic device being connected to a second bus, the method comprising:
   selecting a first clock frequency for the first electronic device and a second clock frequency for the second electronic device, based at least on information about the first and second electronic devices and the zero or more other electronic devices installed in the system, wherein the information about the first and second electronic devices comprises information about bandwidth characteristics of the first and second electronic devices;
   generating a clock signal for the first electronic device in accordance with the selected first clock frequency; and
   generating a clock signal for the second electronic device in accordance with the selected second clock frequency.

2. The method of claim 1, further comprising supplying a first clock signal having the first clock frequency to the first electronic device and supplying a second clock signal having the second clock frequency to the second electronic device.

3. The method of claim 1, further comprising supplying a first clock signal having the first clock frequency to the first bus and supplying a second clock signal having the second clock frequency to the second bus.

4. The method of claim 1, wherein:
   wherein the information about bandwidth characteristics comprises a first bandwidth characteristic for the first device and a second bandwidth characteristic for the second device; and the selecting the first and second clock frequencies comprises:
      if the first bandwidth characteristic is larger than the second bandwidth characteristic:
         selecting a higher first clock frequency than would otherwise be selected and selecting a lower second clock frequency than would otherwise be selected; and
      if the second bandwidth characteristic is larger than the first bandwidth characteristic:
         selecting a higher second clock frequency than would otherwise be selected and selecting a lower first clock frequency than would otherwise be selected.

5. The method of claim 1, wherein the information about the first and second electronic devices and the zero or more other electronic devices comprises a number of the other electronic devices installed in the system.

6. The method of claim 1, wherein the selecting a clock frequency is further based on a thermal budget for the system.

7. The method of claim 1, wherein the selecting a clock frequency is further based on a power consumption budget for the system.

8. The method of claim 1, further comprising ascertaining at least some of the information about the first and second electronic devices and the zero or more other electronic devices installed in the system.

9. The method of claim 8, wherein the ascertaining at least some of the information comprises:
   querying at least one of the first and second electronic devices; and
   in response to the querying, receiving information from at least one of the first and second electronic devices.

10. The method of claim 8, wherein the ascertaining at least some of the information comprises reading at least a portion of a memory.

11. The method of claim 10, wherein the memory comprises a dual in-line package (DIP) switch.

12. The method of claim 1, further comprising ascertaining at least some of the information about the first and second electronic devices through a user interface.

13. The method of claim 1, wherein the information about the first and second electronic devices and the zero or more other electronic devices comprises information about an amount of heat at least one of the first and second electronic devices and the zero or more other electronic devices would generate in relation to a clock frequency at which the corresponding at least one of the first and second electronic devices and the zero or more other electronic devices would operate.

14. The method of claim 1, wherein at least one of the first and second electronic devices is removably installed in an expansion slot.

15. The method of claim 1, wherein at least one of the zero or more other electronic devices is removably installed in an expansion slot.

16. An article of manufacture, comprising:
   a computer-readable medium storing computer-executable instructions capable of determining clock frequencies for first and second electronic devices installed in a system with zero or more other electronic devices, the first electronic device being connected to a first bus and the second electronic device being connected to a second bus, comprising:
      selecting a first clock frequency for the first electronic device and a second clock frequency for the second electronic device, based at least on information about the first and second electronic devices and the zero or more other electronic devices installed in the system, wherein the information about the first and second electronic devices comprises information about bandwidth characteristics of the first and second electronic devices;
      generating a clock signal for the first electronic device in accordance with the selected first clock frequency; and
      generating a clock signal for the second electronic device in accordance with the selected second clock frequency.

17. A frequency manager for determining clock frequencies for first and second electronic devices installed in a system with zero or more other electronic devices, the first electronic device being connected to a first bus and the second electronic device being connected to a second bus, comprising:
- a frequency calculator selecting a first clock frequency for the first electronic device and a second clock frequency for the second electronic device, based at least on information about the first and second electronic devices and the zero or more other electronic devices installed in the system, wherein the information about the first and second electronic devices comprises information about bandwidth characteristics of the first and second electronic devices; and
- an interface connected to the frequency calculator, to a first clock signal generator and to a second clock frequency generator, the interface sending commands:
  - to the first clock signal generator to generate clock signals at the first clock frequency and to the second clock frequency generator to generate clock signals at the second clock frequency.

18. The frequency manager of claim 17, wherein:
wherein the information about bandwidth characteristics comprises device has a first bandwidth characteristic for the first device and a second bandwidth characteristic for the second device; and if the first bandwidth characteristic is larger than the second bandwidth characteristic:
  the frequency calculator selects a higher first clock frequency than would otherwise be selected and the frequency calculator selects a lower second clock frequency than would otherwise be selected; and
if the second bandwidth characteristic is larger than the first bandwidth characteristic:
  the frequency calculator selects a higher second clock frequency than would otherwise be selected and the frequency calculator selects a lower first clock frequency than would otherwise be selected.

19. The frequency manager of claim 17, wherein the information about the first and second electronic devices and the zero or more other electronic devices comprises a number of the other electronic devices installed in the system.

20. The frequency manager of claim 17, wherein the frequency calculator further bases the selecting a first and second clock frequency on a thermal budget for the system.

21. The frequency manager of claim 17, wherein the frequency calculator further bases the selecting a first and second clock frequency on a power consumption budget for the system.

22. The frequency manager of claim 17, further comprising an information input ascertaining at least some of the information about the first and second electronic devices.

23. The frequency manager of claim 22, wherein the information input queries at least one of the first and second electronic devices to ascertain the at least some of the information about the first and second electronic devices.

24. The frequency manager of claim 21, further comprising a memory storing at least some of the information about the first and second electronic devices.

25. The frequency manager of claim 23, wherein the memory comprises a dual in-line package (DIP) switch.

26. The frequency manager of claim 17, further comprising a user interface, by which the frequency manager can ascertain at least some of the information about the first and second electronic devices.

27. The frequency manager of claim 17, wherein the information about the first and second electronic devices and the zero or more other electronic devices comprises information about an amount of heat at least one of the first and second electronic devices and the zero or more other electronic devices would generate in relation to a clock frequency at which the corresponding at least one of the first and second electronic devices and the zero or more other electronic devices would operate.

28. The frequency manager of claim 17, wherein at least one of the first and second electronic devices is removably installed in an expansion slot.

29. The frequency manager of claim 17, wherein at least one of the zero or more other electronic devices is removably installed in an expansion slot.

* * * * *

UNITED STATES PATENT AND TRADEMARK OFFICE
CERTIFICATE OF CORRECTION

| | |
|---|---|
| PATENT NO. | : 7,146,519 B2 |
| APPLICATION NO. | : 10/646099 |
| DATED | : December 5, 2006 |
| INVENTOR(S) | : Andrew H. Barr et al. |

It is certified that error appears in the above-identified patent and that said Letters Patent is hereby corrected as shown below:

In column 6, line 9, delete "HP zxl" and insert -- HP zx1 --, therefor.

In column 16, line 15, in Claim 24, delete "claim 21," and insert -- claim 22, --, therefor.

Signed and Sealed this

Twenty-second Day of December, 2009

David J. Kappos
*Director of the United States Patent and Trademark Office*